United States Patent
Gray

(10) Patent No.: US 7,044,287 B1
(45) Date of Patent: May 16, 2006

(54) CONVEYOR BELT WASHER

(75) Inventor: Kevin V. Gray, Farmingdale, NY (US)

(73) Assignee: Tarpaulin.Com, Inc., Plainview, NY (US)

( * ) Notice: Subject to any disclaimer, the term of this patent is extended or adjusted under 35 U.S.C. 154(b) by 259 days.

(21) Appl. No.: 10/608,891

(22) Filed: Jun. 27, 2003

(51) Int. Cl.
 *B65G 45/00* (2006.01)
(52) U.S. Cl. ............................ 198/495; 198/494
(58) Field of Classification Search ............ 198/495, 198/493, 494
 See application file for complete search history.

(56) References Cited

U.S. PATENT DOCUMENTS

| | | | |
|---|---|---|---|
| 2,266,309 A | 12/1941 | Cohen | |
| 3,017,986 A | 1/1962 | Ackles | |
| 3,762,858 A * | 10/1973 | Torrence | 110/236 |
| 3,815,728 A | 6/1974 | Vaughan | |
| 3,844,133 A * | 10/1974 | Bierley et al. | 62/341 |
| 3,872,681 A * | 3/1975 | Bierley et al. | 62/63 |
| 3,886,959 A * | 6/1975 | Stott | 134/134 |
| 4,051,211 A | 9/1977 | Beser et al. | |
| 4,196,693 A * | 4/1980 | Unversaw | 119/164 |
| 4,777,972 A | 10/1988 | Adam | |
| 4,860,883 A | 8/1989 | Knaul et al. | |
| 4,955,209 A * | 9/1990 | Smith | 62/380 |
| 5,117,967 A | 6/1992 | Morrow et al. | |
| 5,307,993 A * | 5/1994 | Simonetti et al. | 239/247 |
| 5,333,724 A * | 8/1994 | Wingfield et al. | 198/495 |
| 5,355,992 A | 10/1994 | Baig et al. | |
| 5,368,650 A | 11/1994 | Tanaka et al. | |
| 5,372,243 A | 12/1994 | King | |
| 5,598,915 A * | 2/1997 | Malmberg et al. | 198/495 |
| 5,649,616 A | 7/1997 | Stecklow | |
| 5,706,932 A | 1/1998 | White | |
| 5,783,044 A * | 7/1998 | Schneider et al. | 162/278 |
| 6,051,076 A | 4/2000 | Oechsle et al. | |
| 6,196,374 B1 | 3/2001 | Kilgert et al. | |
| 6,254,730 B1 | 7/2001 | Macierewicz | |
| 6,360,874 B1 | 3/2002 | Virippil et al. | |
| 6,364,959 B1 | 4/2002 | Straub et al. | |
| 6,401,910 B1 | 6/2002 | Pellini | |
| 6,478,141 B1 | 11/2002 | Virippil et al. | |

FOREIGN PATENT DOCUMENTS

JP 09038596 * 7/1995

* cited by examiner

*Primary Examiner*—Gene O. Crawford
*Assistant Examiner*—Rashmi Sharma
(74) *Attorney, Agent, or Firm*—Hoffmann & Baron, LLP

(57) ABSTRACT

A conveyor belt washer for cleaning a moving conveyor belt with a pressurized fluid. The conveyor belt washer includes a washtank, a spray assembly located within the washtank and having at least one spray head rotatably mounted with respect to the tank, and at least one splash plate defining a substantially planar splash surface mounted within the washtank and positioned on the opposing side of the conveyor belt from that of the spray assembly. The splash surface is sized to substantially correspond with the circular path defined by the rotatable spray head whereby pressurized fluid passing through the belt is continuously redirected against the opposing side of the conveyor belt upon contact with the splash surface.

25 Claims, 9 Drawing Sheets

CONVEYOR BELT WASHER

BACKGROUND OF INVENTION

The present invention relates to a conveyor belt washer and, more particularly, to a washer providing enhanced cleaning performance of a conveyor belt.

Conveyor belts are used in many industrial applications, including applications involving preparation of food products. It will be appreciated that a conveyor belt accumulates dirt and other deposits over time and through usage. Although cleanliness is desirable in many applications, it is particularly desirable, and often required, in food preparation applications. In addition to normal dirt and dust which might accumulate on a conveyor belt in a plant, use of a conveyor belt in a food application process often times exposes the belt to spillage and overflow of food products. Over time, these food products can become embedded and, in fact, baked onto the belt, particularly when the belt passes through a high temperature oven.

It will therefore be appreciated by those skilled in the art that cleaning of conveyor belts in food application processes is a necessary and ongoing requirement. Often times, the washtank is permanently installed as part of the conveyor belt setup whereby a point on a conveyor belt will pass through the washtank each time it completely traverses the entire track of the setup.

Prior art washtanks have typically utilized a pair of opposing spray bars positioned on opposite sides of the belt and traversing the width of such belt whereby a first curtain of fluid is directed downward against the top surface of the belt and a second curtain of fluid is directed upwards against the bottom surface of the belt. In this regard, each spray bar includes a plurality of nozzles extending along the length thereof. It will be appreciated that as the number of nozzles increases (e.g., to traverse a wider belt), the velocity of the pressurized fluid exiting each nozzle decreases, and the fluid is therefore directed against the belt with less force. Of course, there is a practical limitation (based upon cost and engineering design criteria) regarding the amount of pressure which may be utilized in a conveyor belt washer.

Moreover, it will be recognized that the foregoing prior art design causes pressurized fluid to be directed against each point on the conveyor belt a single time only as such conveyor belt is passed through washer. Of course, a single application of pressurized fluid to a particular spot may be insufficient to loosen the dirt/debris secured to the belt.

It will be further appreciated that the use of opposing spray bars having a plurality of nozzles increases the difficulty and costs associating with servicing the washer. Particularly, the greater the number of nozzles, the greater the servicing requirements. Moreover, the location of the bars within the prior art tanks often makes access to such bars difficult.

It is of course advantageous to contain as much of the pressurized fluid within the tank as possible. Stated differently, the escape of any pressurized fluid (e.g., through spray) from the washtank during the washing procedure is preferably avoided. The known prior art washtanks often fail to provide adequate containment of the pressurized fluid therein during the washing procedure.

There is therefore a need in the art for a conveyor belt washer which provides increased cleaning performance, adaptability to various-sized conveyor belts including belts having substantial widths, improved serviceability, and improved containment of pressurized fluid within the washtank.

SUMMARY OF THE INVENTION

The present invention, which addresses the needs of the prior art, provides a conveyor belt washer for cleaning a moving conveyor belt with a pressurized fluid, the belt having opposing planar surfaces. The conveyor belt washer includes a washtank sized and configured to allow the belt to movably pass therethrough, the washtank defining a substantially enclosed container. The conveyor belt washer further includes at least one spray assembly located within the washtank and positioned adjacent one of the opposing planar surfaces. The spray assembly includes at least one spray head oriented to direct the pressurized fluid against the planar surface. The spray head is rotatably mounted with respect to the tank wherein the head is rotatable through a circular path having a predetermined diameter D. Finally, the conveyor belt washer includes at least one splash plate defining a substantially planar splash surface mounted within the washtank and positioned adjacent the other of the opposing planar surfaces. The splash surface is sized to substantially correspond with the circular path of the rotatable spray head wherein the pressurized fluid passing through the belt is continuously redirected against the other opposing planar surface upon contact with the splash surface as the spray head is rotated.

The present invention further provides a conveyor belt washer for cleaning a moving conveyor belt with a pressurized fluid, the belt having opposing planar surfaces. The conveyor belt washer includes a washtank sized and configured to allow the belt to movably pass therethrough, the washtank defining an essentially enclosed container. The conveyor belt washer further includes a pair of spray assemblies located within the washtank and positioned adjacent one of the opposing planar surfaces. Each of the spray assemblies includes at least one spray head oriented to direct the pressurized fluid against the planar surface. The spray head is rotatably mounted with respect to the tank wherein the head is rotatable through a circular path having a predetermined diameter D. Finally, the conveyor belt washer includes a pair of splash plates defining a pair of substantially planar splash surfaces mounted within the washtank and positioned adjacent the other of the opposing planar surfaces. The splash surfaces are sized to substantially correspond with the circular path of the rotatable spray heads whereby the pressurized fluid passing through the belt is continuously redirected against the other planar surface upon contact with the splash surfaces as the spray heads are rotated.

Finally, the present invention provides a conveyor belt washer for cleaning a moving conveyor belt with a pressurized fluid, the belt having opposing planar surfaces. The conveyor belt washer includes a washtank sized and configured to allow the belt to movably pass therethrough, the washtank defining a substantially enclosed container. The conveyor belt washer further includes a spray assembly located within the washtank and positioned adjacent one of the opposing planar surfaces. The spray assembly includes at least one spray head oriented to direct the pressurized fluid against the planar surface over a predetermined area. Further, the conveyor belt washer includes a splash plate defining a substantially planar splash surface mounted within the washtank and positioned adjacent the other of the opposing planar surface. The splash surface is sized to substantially correspond with the predetermined area whereby the pressurized fluid passing through the belt is continuously redirected against the other opposing planar surface upon contact with the splash surface.

As a result, the present invention provides a conveyor belt washer which provides increased cleaning performance, adaptabilty to various-sized conveyor belts including belts of substantial width, improved serviceability, and improved containment of pressurized fluid within the washtank.

DETAILED DESCRIPTION OF THE INVENTION

Figure 1:
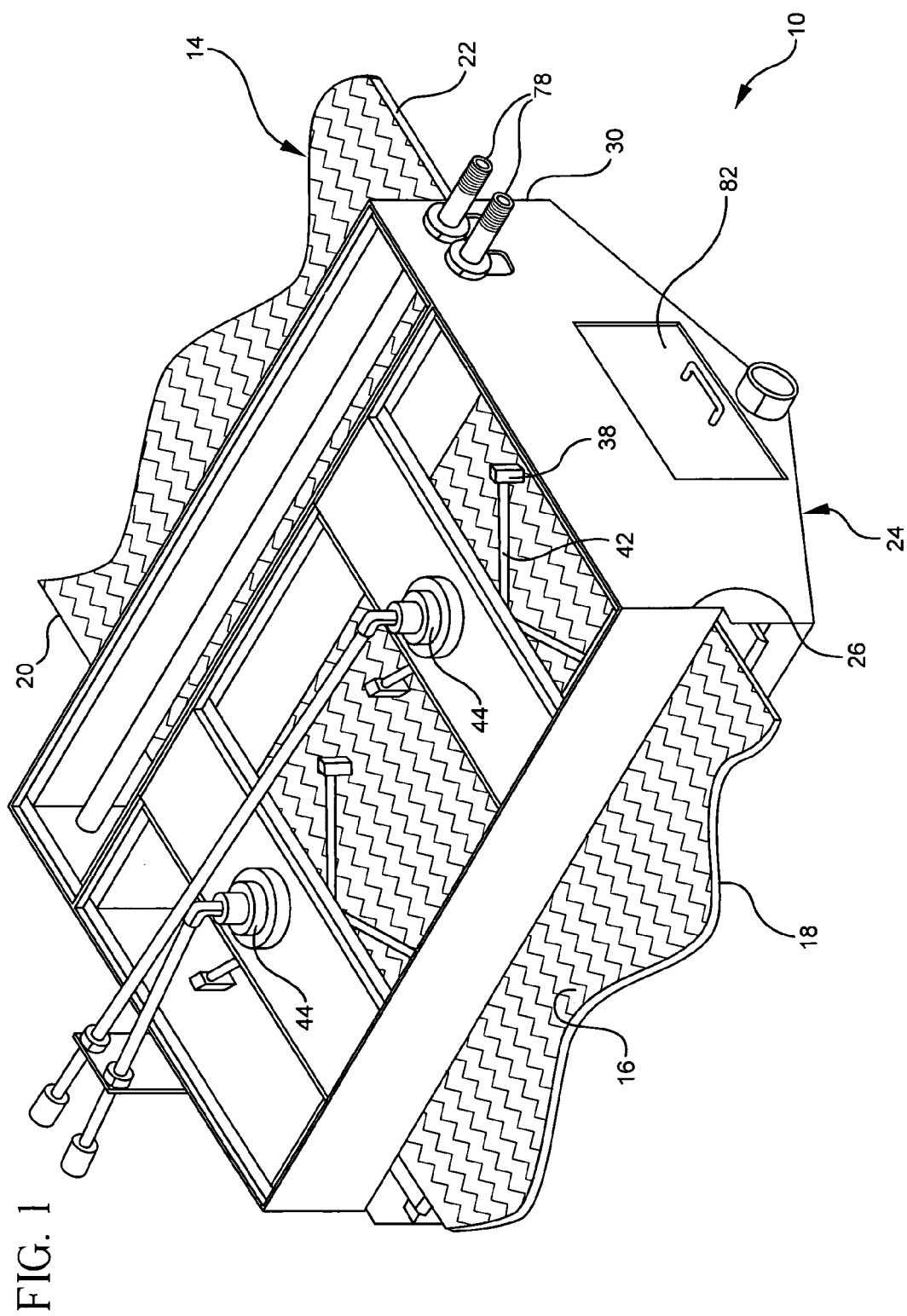
FIGS. 1 and 2 are front perspective views of the conveyor belt washer of the present invention.
Figure 2:
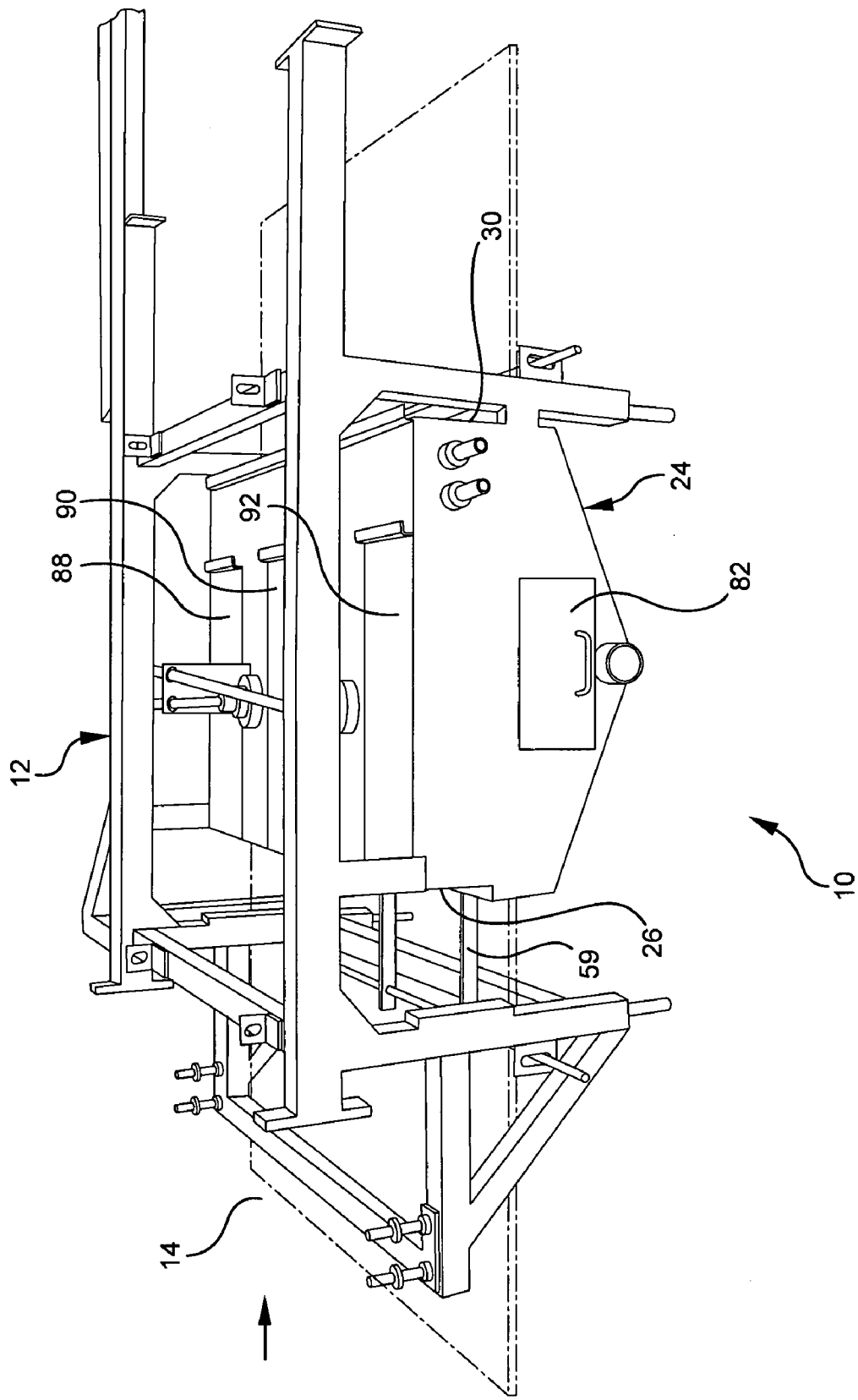

Referring to the drawings, conveyor belt washer 10 is shown in FIGS. 1 and 2. As shown in FIG. 2, washer 10 may be supported by a frame 12. Frame 12 may be part of an existing set-up, or the frame may be designed and configured to allow washer 10 to be incorporated into the existing set-up. Particularly, washer 10 would be incorporated into a conveyor belt application at a predetermined location such that conveyor belt 14 can pass therethrough in the direction of arrow F.

It will be appreciated that conveyor belt 14 can be formed in many different configurations and from different materials. As shown in FIG. 1, belt 14 has opposing planar surfaces 16, 18. As oriented in FIG. 1, planar surface 16 is utilized to transport items, e.g., food items through a preparation/cooking process. Although keeping planar surface 16 clean of dirt/debris is of primary importance, it will be appreciated that dirt/debris also accumulates along planar surface 18 and along edges 20, 22. In this regard, edges 20, 22 are often times formed with a tighter mesh, and therefore tend to more readily accumulate dirt/debris.

Figure 3:
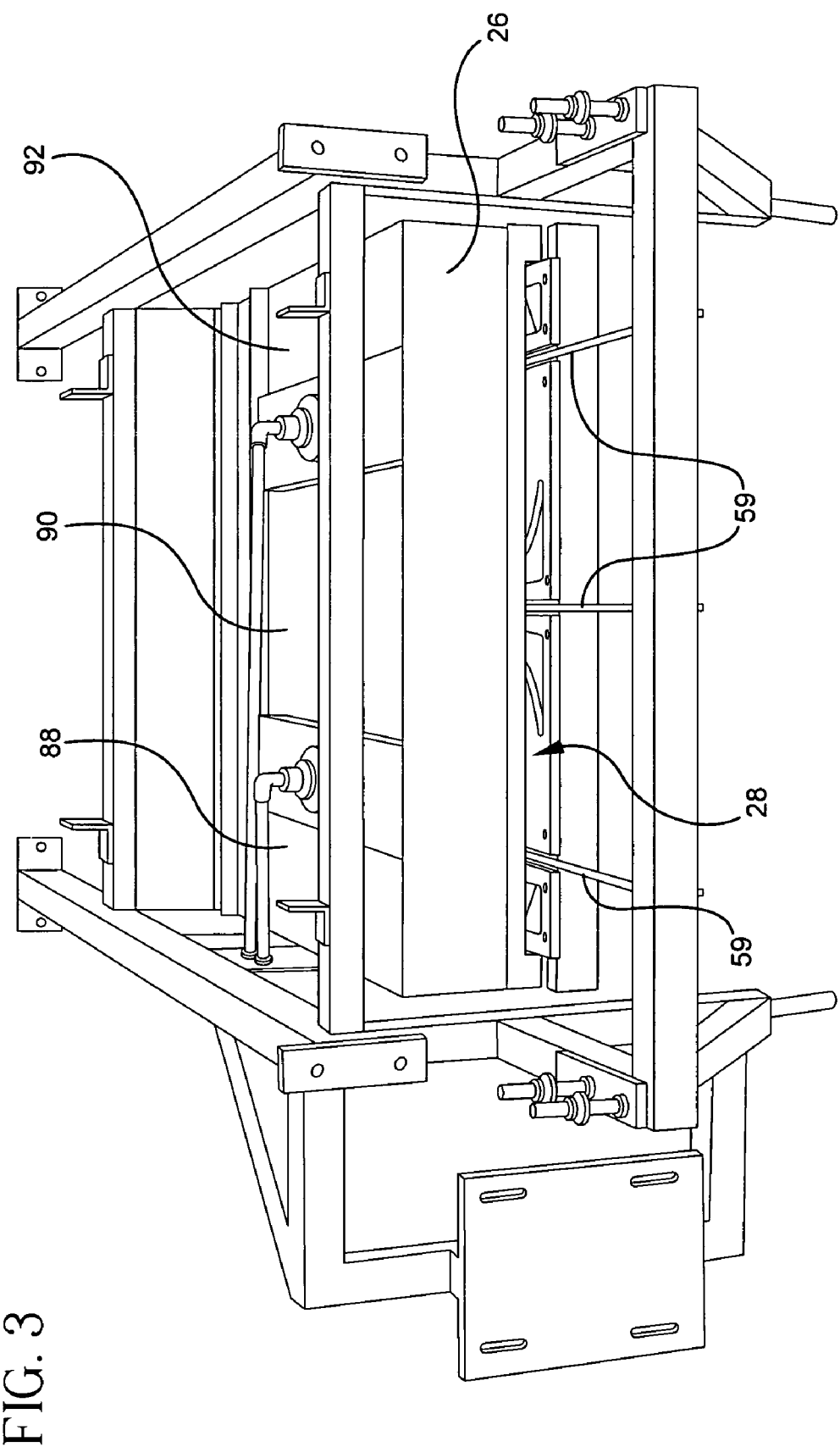
FIG. 3 is a side perspective view of the conveyor belt washer of FIG. 1.
Figure 4:
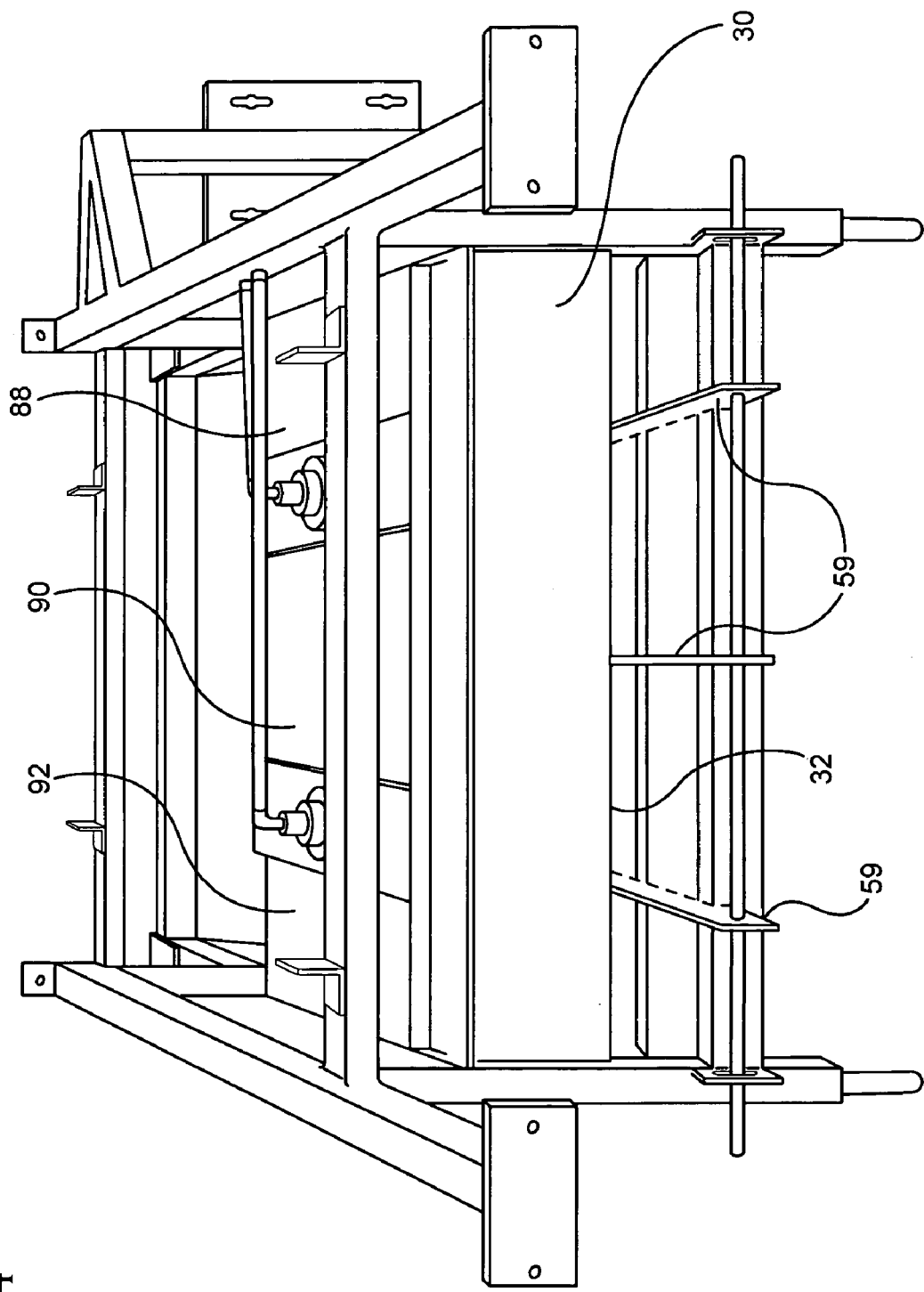
FIG. 4 is a perspective view of the opposing side shown in FIG. 3.

Washer 10 includes a washtank 24. Washtank 24 is sized and configured to allow belt 14 to movably pass therethrough, and defines a substantially enclosed container. Particularly, washtank 24 includes a leading edge 26 (see also FIG. 3) having a slot 28 sized to allow passage of belt 14 into washtank 24. Washtank 24 also includes a trailing edge 30 as best illustrated in FIG. 4. Trailing edge 30 includes a slot 32 sized to allow passage of belt 14 out of washtank 24.

Figure 5A:
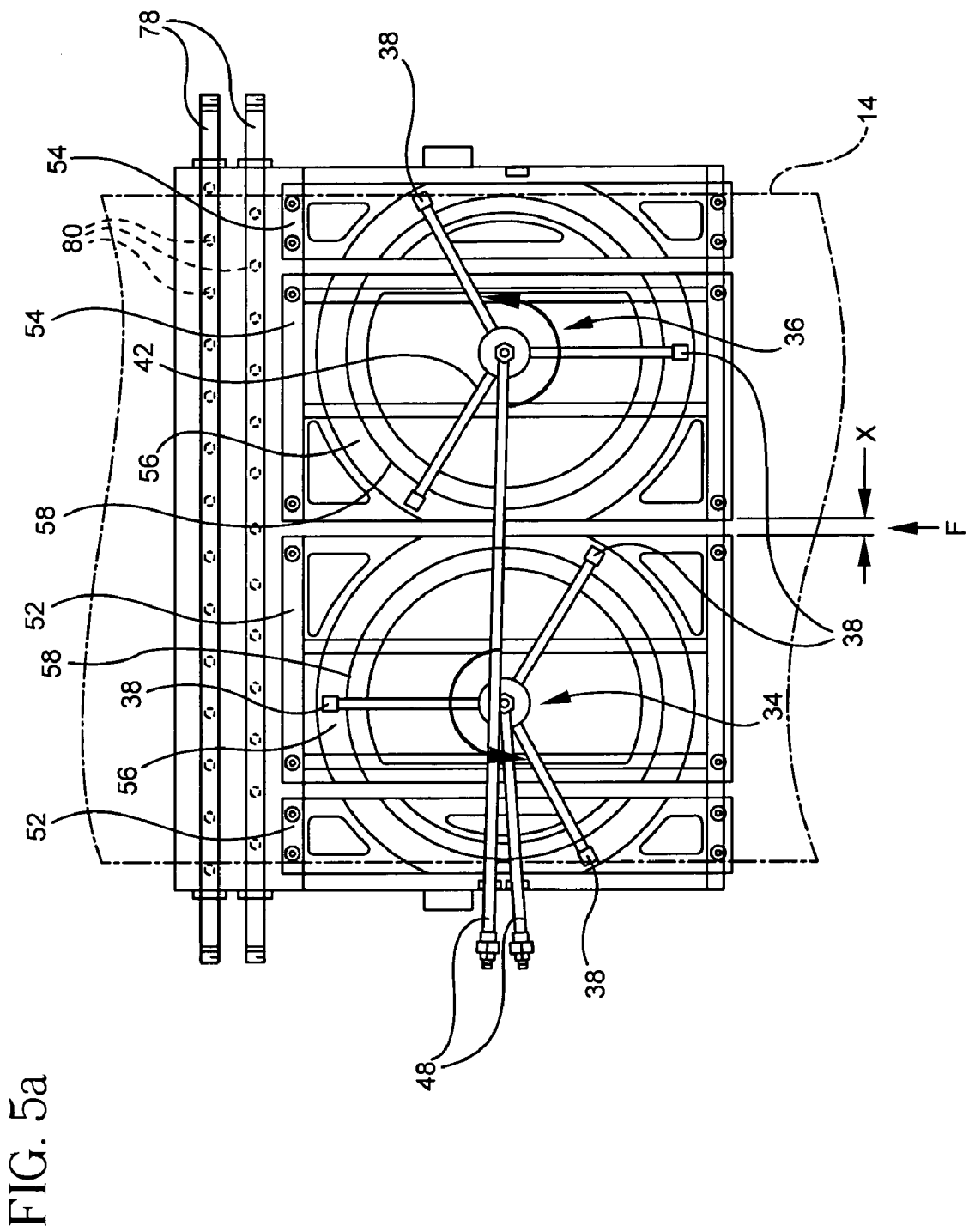
FIG. 5a is a top plan view, in partial section, of the conveyor belt washer of FIG. 1.
Figure 5B:
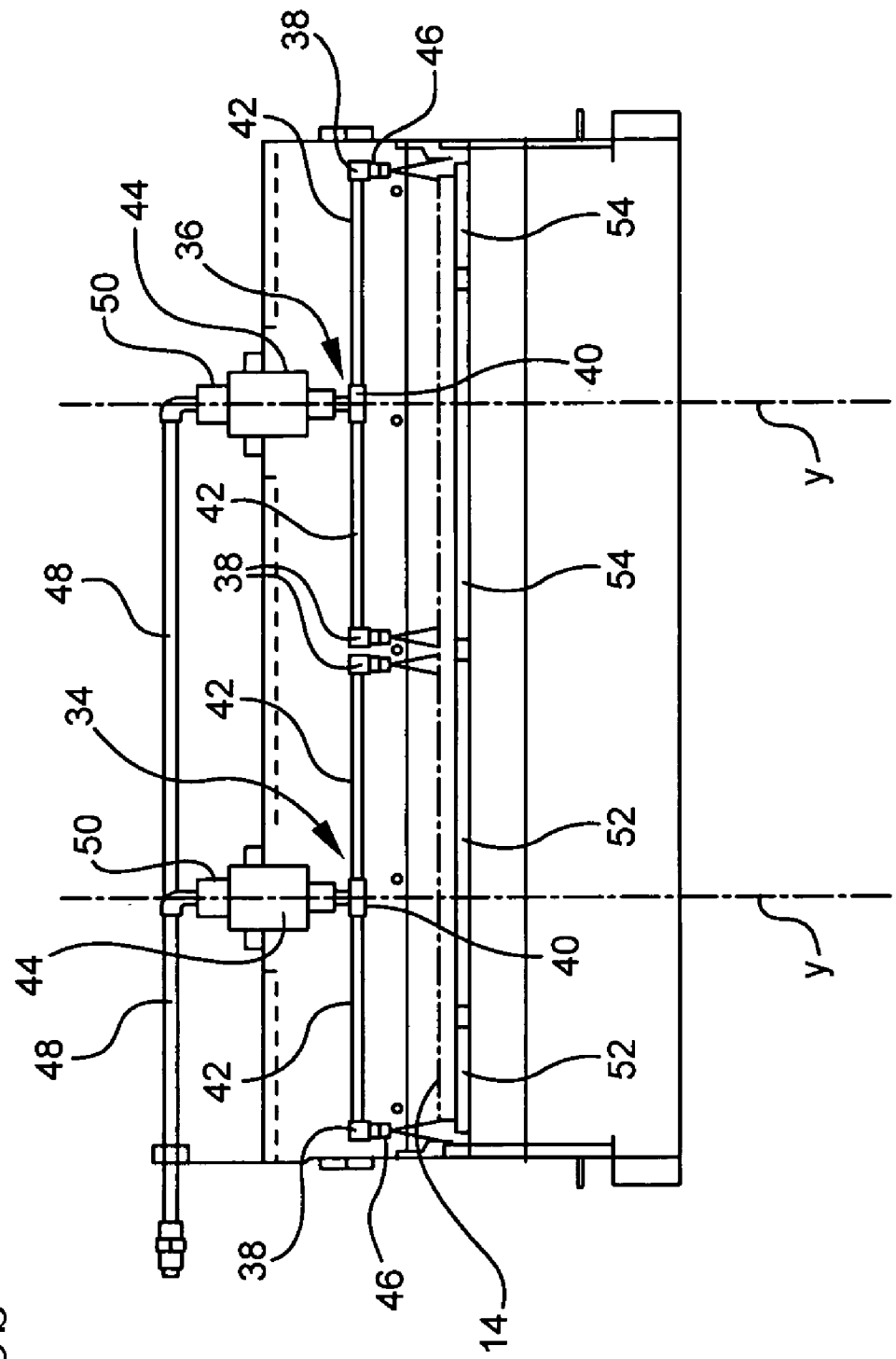
FIG. 5b is a side elevational view, in partial section, of the conveyor belt washer of FIG. 1.
Figure 5C:
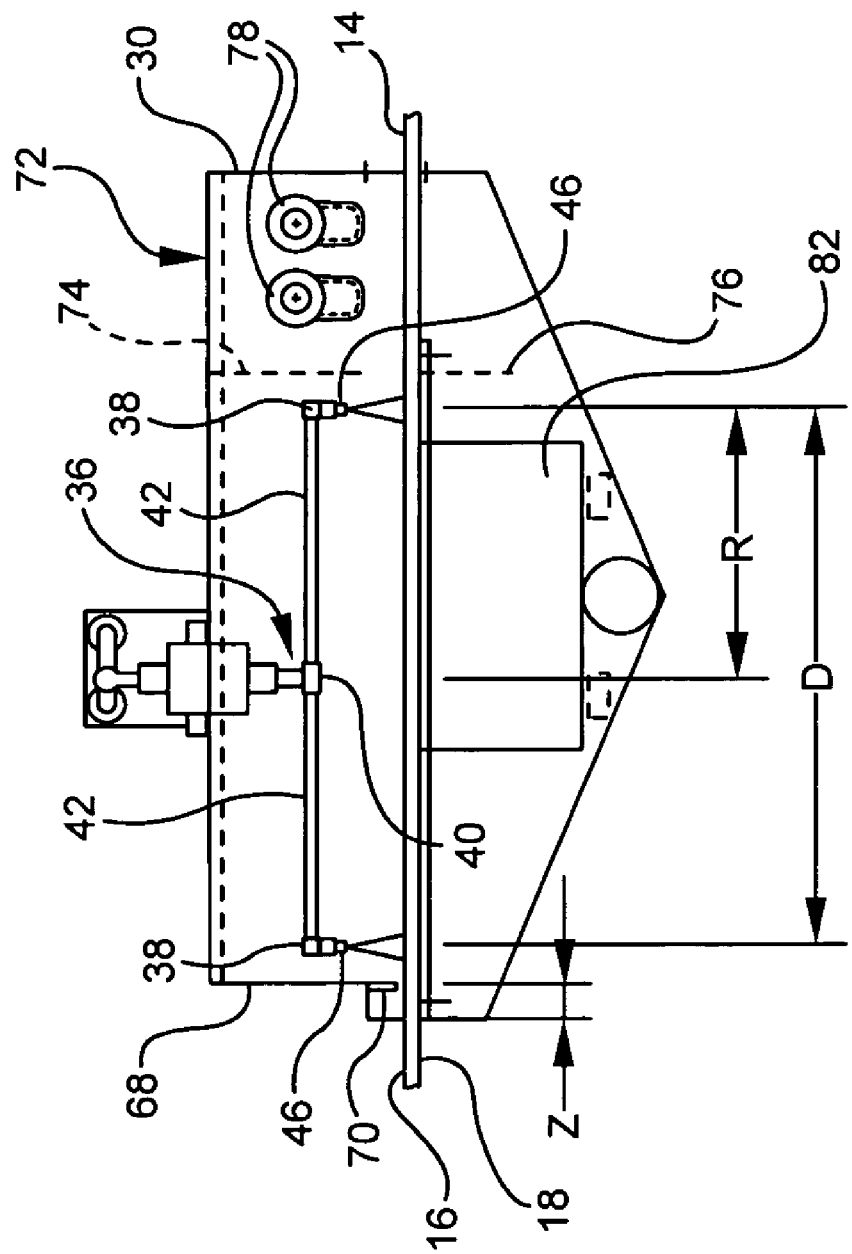
FIG. 5c is a front elevational view, in partial section, of the conveyor belt washer of FIG. 1.

Conveyor belt washer 10 further includes spray assemblies 34, 36 (see FIGS. 5a, 5b and 5c). It will be appreciated by those skilled in the art that washer 10 includes two spray assemblies to allow cleaning across the entire width of conveyor belt 14 while minimizing the overall size of washer 10. In other embodiments, washer 10 may include a single spray assembly for belts having smaller widths, or may include additional spray assemblies for belts having greater widths. As shown, each spray assembly is located within washtank 24 and is positioned adjacent planar surface 16.

Spray assemblies 34, 36 each include a plurality of spray heads 38 connected to a hub 40 via a plurality of fluid bars 42. Hubs 40 are rotatably supported by bearings 44, thereby allowing spray assemblies 34, 36 to rotate about spin axes Y. In this regard, each of spin axes Y is located perpendicular to planar surface 16 and passes through the centers of bearings 44 and hubs 40. It will be appreciated that each of the rotating spray assemblies defines a circular path having a diameter D. Each of spray heads 38 is located a distance R from spin axis Y, distance R being equal to ½ of diameter D.

Spray heads 38 are each oriented to direct a pressurized cleaning fluid (e.g., water) against planar surface 16. In this regard, spray heads 38 are angled with respect to planar surface 16 to cause the spray heads to rotate about spin axis Y when pressurized fluid is directed through fluid bars 42 into spray heads 38. Each spray head includes at least one nozzle 46, the nozzles being mounted at varying angles with respect to planar surface 16 to ensure that the pressurized fluid directed thereagainst forms a continuous path.

A source of pressurized fluid is connected to spray assemblies 34, 36 through pipes 48. Each of the pipes terminates at a connection port 50. One advantage of the arrangement of the spray assemblies shown in FIGS. 5a–5c is that upon disconnection of the pressurized fluid from the spray assemblies, each of the spray assemblies undergoes gravity-based drainage of any fluid remaining therein. This allows use of the present washer within a freezer application.

In one preferred application, water pressure at a minimum of 500 psi at 12 gpm is connected to pipes 48. It will be appreciated by those skilled in the art that the design disclosed herein allows the cleaning of a belt having a substantial width with a minimum amount of spray heads/nozzles. This is contrasted to the prior art technique of extending a continuous spray bar across the width of a belt, the spray bar having multiple nozzles extending along its length.

As shown, washer 10 utilizes a total of six spray heads 38 to clean the entire width of conveyor belt 14. By way of example, a prior art device utilizing a continuous spray bar extending across the width of conveyor belt 14 might require two or three times that number of nozzles. Accordingly, the reduced number of nozzles required in the washer of the present invention ensures that the velocity of the fluid exiting each spray head is not significantly reduced. There is therefore no need to expend additional costs to increase the pressure requirements of the system. Moreover, because spray heads 38 are rotated through diameter D, each point on planar surface 16 passing therebelow is subjected to pressurized fluid at multiple points. This, of course, contrasts with the prior art devices wherein each point on the conveyor belt is subjected to pressurized fluid only a single time as the conveyor belt passes through the washer. Preferably, diameter D is selected to ensure that edges 20, 22 are also cleaned. Thus, as spray heads 38 are rotated, the pressurized fluid exiting therefrom is able to impact the edges of the belt.

It has been discovered herein that both planar surfaces of a conveyor belt may be cleaned via a spray assembly located on a single side thereof. As best shown in FIG. 5b, spray assemblies 34, 36 are located above belt 14 and adjacent planar surface 16. The washer of the present invention includes a pair of splash plates 52, 54 positioned below and adjacent planar surface 18. Splash plates 52, 54 may be formed from various plastic or metal materials. In one preferred embodiment, the splash plates are formed from ultra high molecular weight plastic (UHMW).

Each of the splash plates defines a substantially planar splash surface 56. Splash surfaces 56 are sized to substantially correspond with the circular path defined by the rotatable spray heads. As a result, pressurized fluid passing through the belt is continuously redirected against planar surface 18 upon contact with splash surfaces 56. It will be appreciated that the use of splash surfaces 56 to clean the opposing planar surface of the belt can be utilized with either the rotating design of spray assemblies 34, 36 described hereinabove or with the known prior art spray bars which traverse the width of the belt.

Figure 6:
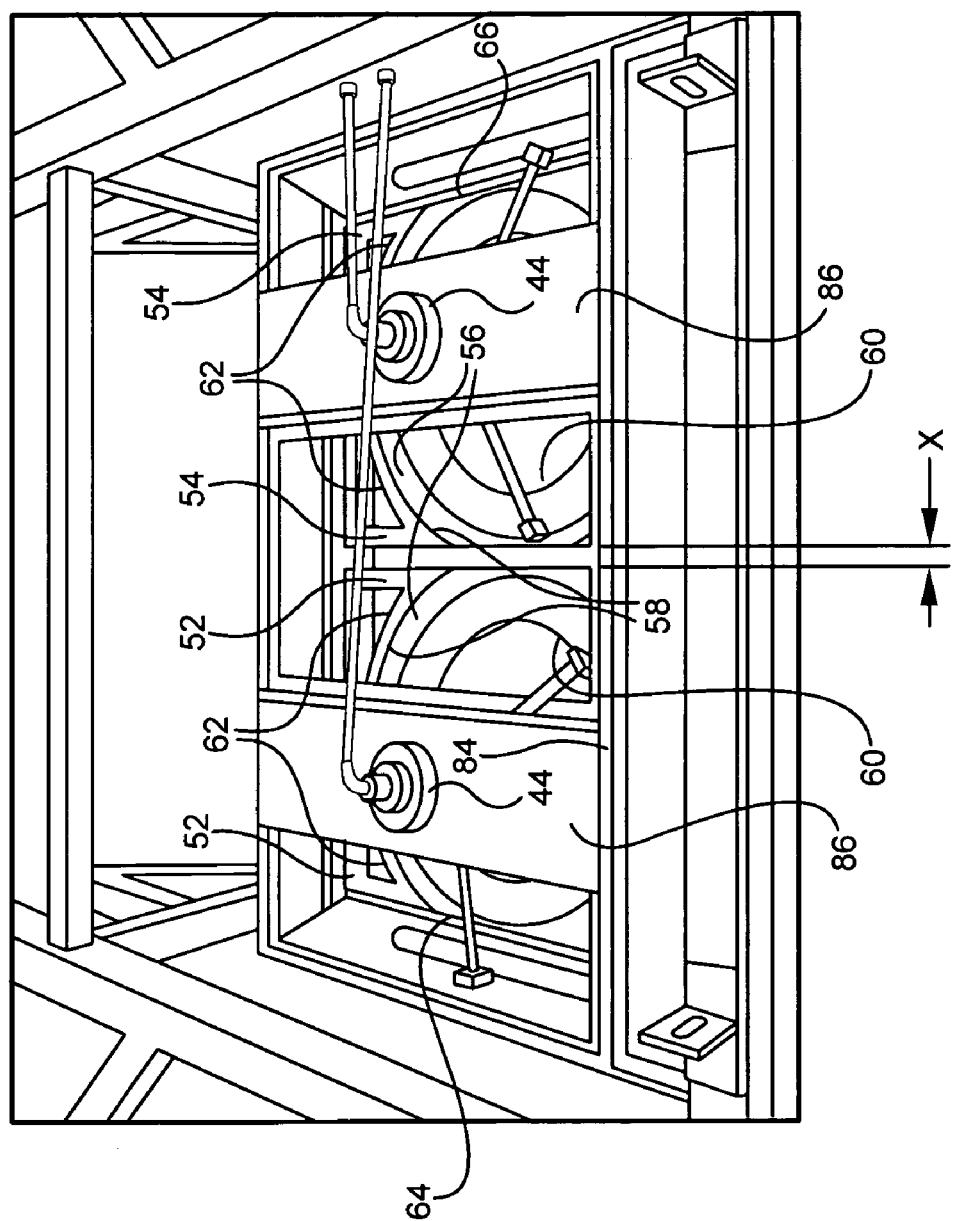
FIG. 6 is a top perspective view of the conveyor belt washer of FIG. 1.

Splash surfaces 56 are preferably located within a circular groove 58 having an average diameter D', diameter D' being approximately equal to diameter D defined by the circular path of spray heads 38. Groove 58 has a depth of approximately 0.03–0.125 inches, and a width of approximately 1–4 inches. In one preferred embodiment, groove 58 has a depth of approximately 0.6 inches, and a width of approximately 2 inches. As shown in FIG. 6, groove 58 is discontinuous at the edges of the splash plates, thus allowing fluid to exit the groove and drain into the bottom of the washtank.

Washer 10 preferably includes a plurality of tracks 59 (see FIGS. 3, 4) which traverse the width of the washtank. Each track is preferably capped with a wearstrip, e.g., a UHMW wearstrip. The tracks are positioned such that the tops of the wearstrips are essentially flush with the top surfaces of the splash plates. Thus, in addition to riding upon tracks 59, planar surface 18 of belt 14 also rides upon and is supported by splash plates 52, 54. Of course, depending on the width of the belt, washer 10 could include more or less than 3 tracks.

Because belt 14 substantially rides upon splash plates 52, 54, as fluid is directed through belt 14 and against splash surface 56, there is limited, if any, spray which is directed outwards towards edges 20, 22 or towards the leading or trailing edges of the belt. Rather, the pressurized fluid directed into circular groove 58 is continuously redirected back against planar surface 18 thereby cleaning and removing dirt/debris therefrom. Splash plates 52, 54 are designed to allow the pressurized fluid, after contacting planar surface 18, to drain back into washtank 24. In this regard, splash plates 52, 54 are preferably formed with cutouts 60 and 62 to facilitate draining of the fluid into the bottom of the tank. Moreover, splash plates 52, 54 are spaced apart a distance X which is sufficient to allow the track to extend therebetween and still allow draining of fluid from grooves 58. Likewise, edges 64, 66 are spaced a distance from the edges of the washtank sufficient to allow the track to extend therebetween and still allow draining of the fluid from grooves 58.

As best seen in FIG. 5c, leading edge 26 of washtank 24 is set back a distance Z in a direction extending towards trailing edge 30. In this regard, wall portion 68 forms a drip edge whereby fluid directed upwards off of planar surface 16 contacts wall portion 68 and drains downward therealong. As a result, inadvertent and undesirably leakage of spray through slot 28 is limited. The washtank design of the present invention also preferably includes a splash curtain 70 affixed to wall portion 68 and extending downward towards planar surface 16 of belt 14. Splash curtain 70 further limits the amount of spray inadvertently exiting the washtank through slot 28.

Washer 10 of the present invention further includes a rear compartment 72 (as best shown in FIG. 5c). Rear compartment 72 is defined by upper wall portion 74 and lower wall portion 76. Lower wall portion 76 preferably supports at least a portion of splash plates 52, 54. Rear compartment 72 is utilized to dry the belt after cleaning. In this regard, the rear compartment includes a pair of spray bars 78 located adjacent planar surface 16, each of the spray bars including a plurality of air nozzles 80. The air nozzles direct drying air downward towards belt 14 whereby any excess fluid is driven off the belt and into the washtank. The nozzles on spray bars 78 are preferably mounted to provide overlapping flows of air whereby a substantially continuous air curtain is provided extending across the width of belt 14. As a result, any excess fluid spray directed towards slot 32 is retarded by the air curtain. Spray bars 78 are preferably mounted to the washtank with split collars.

Figure 7:
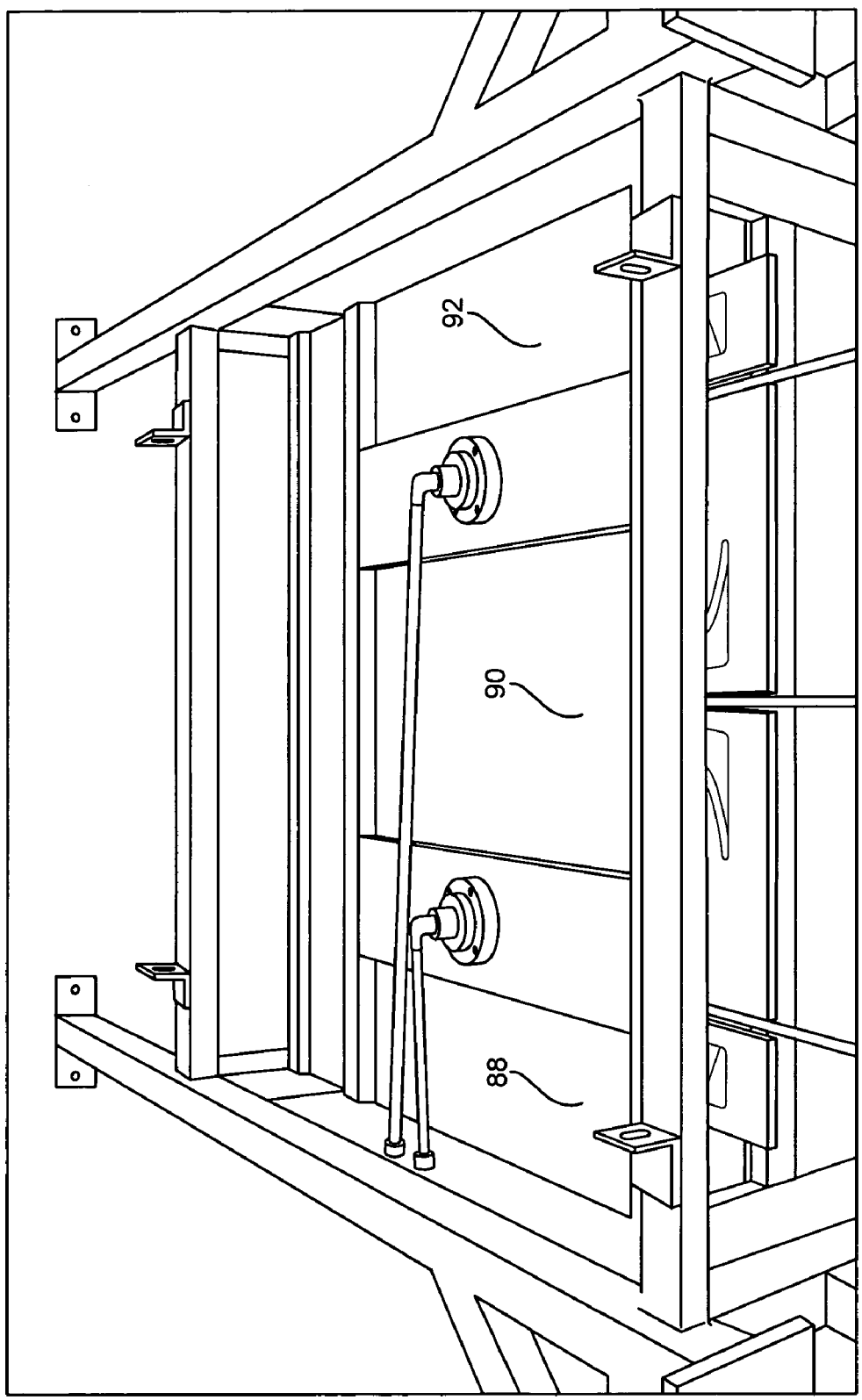
FIG. 7 is another top perspective view of the conveyor belt washer FIG. 1 showing the removable panels in position.

As best shown in FIGS. 1, 2 and 5c, the lower portion of washtank 24 is preferably formed with an angled bottom to facilitate the collection and drainage of the fluid used to clean belt 14. Washtank 24 preferably includes at least one access door 82 to facilitate cleaning and removal of debris from the washtank. In one preferred embodiment, access doors are located on opposing sides of washtank 24. Referring now to FIG. 6, upper edge 84 of washtank 24 defines a substantially rectangular shape. As shown, bearings 44 are preferably mounted to fixed panels 86. Finally, as shown in FIG. 7, removable panels 88, 90 and 92 are used to enclose the washtank during operation, but are readily removable therefrom for cleaning/maintenance of the washtank.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendment and/or deviations be included within the scope of the followings claims.

What is claimed is:

1. A conveyor belt washer for cleaning a moving conveyor belt with a pressurized fluid, said belt having opposing first and second planar surfaces, said conveyor belt washer comprising:
    a) a washtank sized and configured to allow said belt to movably pass therethrough, said washtank defining a substantially enclosed container,
    b) at least one spray assembly located within said washtank and positioned adjacent said first planar surface, said spray assembly including at least one spray head oriented to direct said pressurized fluid against said first planar surface, said spray head being rotatably mounted with respect to said tank wherein said head is rotatable through a circular path having a predetermined diameter D; and
    c) at least one splash plate defining a substantially planar splash surface mounted within said washtank and positioned adjacent said second planar surface, said splash surface being sized to substantially correspond with said circular path of said rotatable spray head wherein said pressurized fluid passing through said belt is continuously redirected against said second planar surface upon contact with said splash surface as said spray head is rotated.

2. The belt washer according to claim 1, further comprising a spin axis Y located perpendicular to said circular path and passing through the center thereof, and wherein said spray assembly includes a plurality of spray heads each located a distance R from said spin axis Y, said distance R being equal to ½ of said diameter D.

3. The belt washer according to claim 2, wherein said spray heads are angled with respect to said first planar surface to cause said spray heads to rotate about said spin axis Y when said pressurized fluid is directed therethrough, said spray assembly further including a plurality of fluid bars extending between said spray heads and said spin axis Y.

4. The belt washer according to claim 3, further comprising a bearing located on said spin axis Y, and wherein said bearing rotatably supports said spray assembly; and
further comprising a connection port for connecting said pressurized fluid to said spray assembly.

5. The belt washer according to claim 4, wherein each of said heads includes at least one nozzle, and wherein said nozzles are mounted at varying angles with respect to said first planar surface to facilitate cleaning thereof.

6. The belt washer according to claim 3, wherein said spray assembly is configured to provide gravity-based drainage thereof through said spray heads upon disconnection of said pressurized fluid therefrom.

7. The belt washer according to claim 1, wherein said splash plate includes a circular groove having an average diameter D' substantially corresponding to said diameter D, and wherein said splash surface is located within said groove.

8. The belt washer according to claim 7, wherein said groove has a depth of approximately 0.03 to 0.125 inches, and has a width of approximately 1 to 4 inches.

9. The belt washer according to claim 8, wherein said groove has a depth of approximately 6.06 inches, and has a width of approximately 2 inches.

10. The belt washer according to claim 7, wherein said second planar surface of said belt is supported by a plurality of tracks.

11. The belt washer according to claim 10, wherein each of said tracks is capped with a wearstrip, and wherein said wearstrip is positioned to be substantially flush with said splash plate.

12. The belt washer according to claim 1, wherein said splash plate is formed from ultra high molecular weight plastic.

13. The belt washer according to claim 1, wherein said splash plate includes a groove, said splash surface being located in said groove, said groove being configured to allow drainage of said pressurized fluid therefrom.

14. The belt washer according to claim 1, wherein said washtank includes a leading edge having a slot sized for passage of said belt therethrough to allow said belt to enter said washtank and a trailing edge having a slot sized for passage of said belt therethrough to allow said belt to exit said washtank.

15. The belt washer according to claim 14, wherein a portion of said leading edge of said washtank forms a drip edge to facilitate the containment of said pressurized fluid within said tank, said drip edge being set back a distance Z in a direction towards said trailing edge.

16. The belt washer according to claim 15, further comprising a splash curtain located adjacent said slot formed in said leading edge of said washtank and cooperating with said drip edge to facilitate the containment of said pressurized fluid within said tank.

17. The belt washer according to claim 14, wherein said washtank includes a rear compartment adjacent said trailing edge for drying of said belt, said rear compartment including a pair of spray bars positioned on one side of said belt to form an air curtain to facilitate drying of said belt and containment of said pressurized fluid within said tank.

18. The belt washer according to claim 17, wherein said washtank includes an upper wall and lower wall, said upper and lower walls defining a leading edge of said rear compartment, and wherein said lower wall supports at least a portion of said splash plate.

19. The belt washer according to claim 17, wherein said spray bars are mounted to said washtank with split collars.

20. The belt washer according to claim 17, wherein said each of said spray bars includes a plurality of air nozzles, said air nozzles being mounted to provide overlapping flows of air whereby a substantially continuous air curtain is provided.

21. The belt washer according to claim 14, wherein said washtank includes an angled bottom to facilitate the collection and drainage of said pressurized fluid.

22. The belt washer according to claim 21, wherein said angled bottom of said wash tank includes at least one access door to facilitate cleaning of said washtank.

23. The belt washer according to claim 22, wherein said washtank includes a top edge defining a substantially rectangular shape; and,
further comprising at least one removable panel cooperating with said top edge for enclosing said washtank during use and for allowing access to said spray assembly during servicing.

24. A conveyor belt washer for cleaning a moving conveyor belt with a pressurized fluid, said belt having opposing first and second planar surfaces, said conveyor belt washer comprising:
a) a washtank sized and configured to allow said belt to movably pass therethrough, said washtank defining a substantially enclosed container;
b) a pair of spray assemblies located within said washtank and positioned adjacent said first planar surface, each of said spray assemblies including at least one spray head oriented to direct said pressurized fluid against said first planar surface, each of said spray heads being rotatably mounted with respect to said tank whereby each of said spray heads is rotatable through a circular path having a predetermined diameter D; and
c) a pair of splash plates defining a pair of substantially planar splash surfaces mounted within said washtank and positioned adjacent said second planar surface, said splash surfaces being sized to substantially correspond with said circular paths of said rotatable spray heads whereby said pressurized fluid passing through said belt is continuously redirected against said second planar surface upon contact with said splash surfaces as said spray heads are rotated.

25. A conveyor belt washer for cleaning a moving conveyor belt with a pressurized fluid, said belt having opposing first and second planar surfaces, said conveyor belt washer comprising:
a) a washtank sized and configured to allow said belt to movably pass therethrough, said washtank defining a substantially enclosed container;
b) a spray assembly located within said washtank and positioned adjacent said first planar surface, said spray assembly including at least one spray head oriented to direct said pressurized fluid against said first planar surface over a predetermined area; and
c) a splash plate defining a substantially planar splash surface mounted within said washtank and positioned adjacent said second planar surface, said splash surface being sized to substantially correspond with said predetermined area whereby said pressurized fluid passing through said belt is continuously redirected against said second planar surface upon contact with said splash surface.

* * * * *

UNITED STATES PATENT AND TRADEMARK OFFICE
CERTIFICATE OF CORRECTION

| | | |
|---|---|---|
| PATENT NO. | : 7,044,287 B1 | Page 1 of 1 |
| APPLICATION NO. | : 10/608891 | |
| DATED | : May 16, 2006 | |
| INVENTOR(S) | : Kevin V. Gray | |

It is certified that error appears in the above-identified patent and that said Letters Patent is hereby corrected as shown below:

Col. 7 line 7
In claim 9, "approximately 6.06 inches" should read --approximately .06 inches--.

Signed and Sealed this

Twelfth Day of September, 2006

JON W. DUDAS
*Director of the United States Patent and Trademark Office*